United States Patent [19]

Petri et al.

[11] Patent Number: 4,923,359
[45] Date of Patent: May 8, 1990

[54] EXTENDABLE BOOM FOR BELT-CONVEYOR

[75] Inventors: Woldemar R. Petri, Cambridge; Stephen L. Foster, RR5 CON 6, London, Ontario both of Canada

[73] Assignee: Stephen Leonard Foster, London, Canada

[21] Appl. No.: 259,265

[22] Filed: Oct. 18, 1988

[30] Foreign Application Priority Data

Oct. 21, 1987 [CA] Canada .................................. 549906

[51] Int. Cl.⁵ ................................................ B60P 1/36
[52] U.S. Cl. .................................... 414/523; 198/313; 198/861.3; 414/528
[58] Field of Search ................ 414/523, 528; 198/313, 198/632, 861.3, 861.2

[56] References Cited

U.S. PATENT DOCUMENTS

| | | | |
|---|---|---|---|
| 748,481 | 12/1903 | Coffin et al. | 198/632 |
| 2,477,790 | 8/1949 | Farr et al. | 198/632 |
| 2,834,487 | 5/1958 | Gaddis | 414/523 |
| 3,642,155 | 2/1972 | Carlson | 414/523 |
| 3,684,255 | 8/1972 | Rossi | 414/523 X |
| 3,863,783 | 2/1975 | Spellman, Jr. | 414/523 |
| 4,537,302 | 8/1985 | Gsponer et al. | 198/861.3 X |

FOREIGN PATENT DOCUMENTS 1592032 7/1981 United Kingdom ................ 414/523

Primary Examiner—David A. Bucci
Attorney, Agent, or Firm—Anthony Asquith & Co.

[57] ABSTRACT

A gravel delivery truck is disclosed, which carries a moving belt conveyor, on a boom that can swing over the delivery site. The boom is foldable for stowage on the truck. The boom includes a foldable extension, hinged to the main length of the boom. For stowage, the extension is doubled over the main length, and the main length is placed lengthwise, behind the driver's cab, down one side of the truck, and over the rear wheels. The folded-over extension fits into the space ahead of the rear wheels, underneath the main length. The layout of the hinge joint is such that, during folding of the boom, the total length of the run of the belt remains the same. The belt can be kept running, and delivering, at all angles of fold of the boom, and even while the boom is being folded.

10 Claims, 8 Drawing Sheets

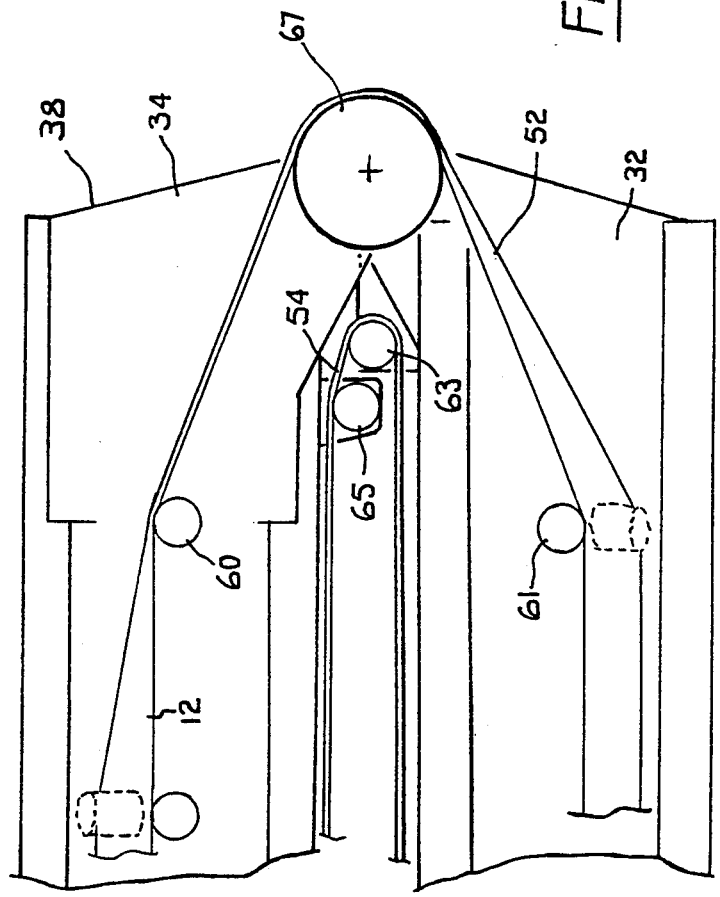

EXTENDABLE BOOM FOR BELT-CONVEYOR

The invention lies in the field of belt conveyors, and in particular of a belt conveyor that is mounted on a boom. The invention relates to providing a means whereby the boom of a belt-conveyor can be made adjustable or extendable in length.

Before describing the invention in its broader aspects, an exemplary embodiment of the invention will first be described. Reference is made to the accompanying drawings, in which:

FIGS. 6-8 are side elevations corresponding to FIG. 5, showing the boom when folded to three different positions.

Figure 1:
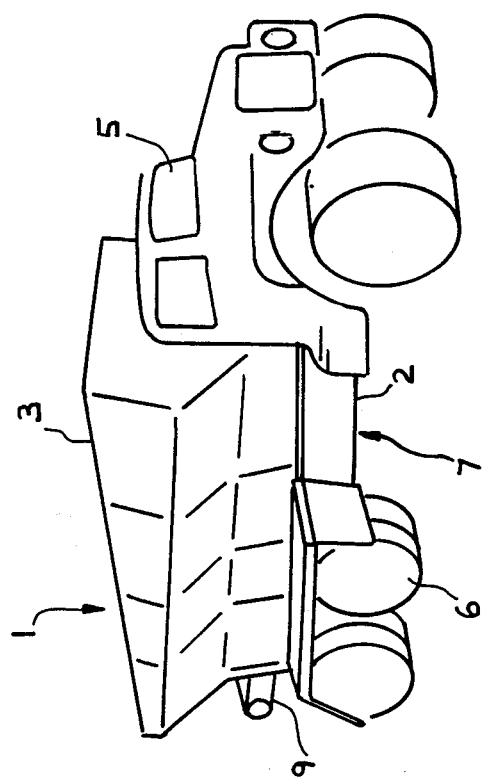
FIG. 1 is a view of a conventional gravel truck.

The gravel truck 1 is of conventional construction. The truck includes a ladder-type chassis, which comprises two deep-sectioned beams 2: the gravel container or hopper 3 of the truck is built on top of the beams 2, and the twin rear axles are mounted below the beams 2. In the conventional ladder-type chassis, the beams 2 extend forwards into the driver's cab 5: in the particular truck shown, the cab 5 is built onto the beams 2. The beams 2 lie between the road wheels 6.

This ladder-type construction is almost completely universal in heavy trucks. It is a feature of the ladder-type chassis that there is a space 7 created laterally alongside the beams 2, in the zone that lies behind the driver's cab 5, and ahead of the rear wheels 6. This space 7 sometimes is occupied by the truck's fuel tank, or air compressor, or by other components. There are two such created spaces 7 on a truck, respectively on the left and right sides of the truck. It is usually the case, at least on gravel trucks, that the said space 7 is unoccupied on at least one side of the truck. This space is important, in the invention, as will be explained presently.

Gravel from the hopper 3 of the gravel truck emerges from through openable gates located beneath the hopper 3 on the centre-line of the truck.

Figure 4:
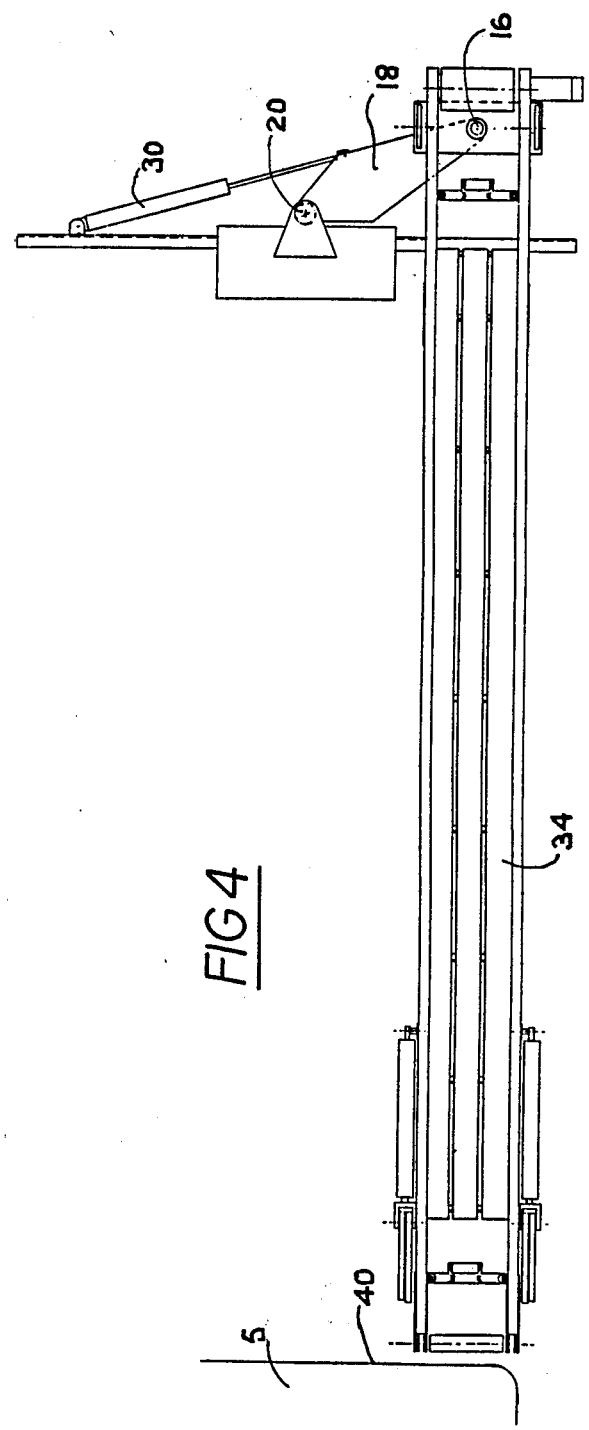
FIG. 4 is a plan view of the truck, corresponding to FIG. 3.

Gravel emerging from the hopper falls onto a length 9 of moving conveyor belt. The belt 9 circulates around a fixed frame (omitted from FIG. 4), and conveys the gravel from under the hopper towards the rear of the truck. Gravel falls off the end of the belt 9 and onto a main belt 12.

The belt 12 is arranged to circulate around a boom 14: the belt feeds outwards along the top of the boom 14, and returns underneath the boom.

The boom 14 is pivotally mounted at the back of the chassis. The mounting includes a double pivot arrangement, in that the boom 14 is pivoted at 16 to an intermediate arm 18, and the intermediate arm 18 is pivoted at 20 to a box 23 which is bolted rigidly to the rear ends of the beams 2. The two pivot axes 16, 20 are vertical, so that the boom may swing in the lateral sense, i.e. from side to side, about either of the two axes 16, 20. The boom may also swing vertically, i.e. up and down, by virtue of a horizontally disposed pivot 25 disposed between the boom 14 and the intermediate arm 18.

A hydraulic ram 27 controls the up and down movement of the boom 14 about the horizontal pivot 25, and rams 29, 30 control the side to side movement about the two vertical axes 16, 20. It will be noted that the two vertical pivots permit the boom, when not in use, to be stowed alongside the chassis.

As described thus far, the construction of the truck and boom are conventional. In use, upon arrival at a building site, the operator parks the truck alongside the site into which the gravel is to be delivered; he manipulates the boom 14 over the site using the hydraulic rams 27, 29, 30, and he sets the belt 12 in motion. As the gravel is being dispensed, the operator adjusts the various rams (and also he can adjust the speed of the belt 12) so as to spread the gravel evenly over the site. (The site in question usually is the floor of the basement of a new building—the gravel is applied over the excavated earth on the basement floor after the basement walls have been poured and set, but before the above-ground walls of the building are started.)

The invention lies in the construction of the boom 14, in that the boom is provided with a folding extension 32.

One of the problems with the conventional, non-extendable, boom is that the length of the boom is limited. During periods of non-use of the boom, the full length of the boom has to lie alongside the truck chassis. It turns out that the length to which it is convenient to make the boom, from the point of view of easy stowage of the boom on the truck during periods of non-use, gives a length of boom that is rather too short to reach the extremities of the typical site.

Of course, if the truck chassis were longer, the boom could be longer; but the chassis length of a truck is set by regulation depending on the type of truck, and it is not practical to deliver gravel and the like in the kinds of trucks that are permitted to be longer. The most common design of gravel delivery truck is the rigid chassis design (as distinct from the articulated, or tractor/trailer, design).

On the other hand, of course sometimes building sites are of such size and shape that the conventional non-extendable boom can deliver gravel evenly over the whole area.

It is recognised, however, that in a large number of cases, the length of the conventional, non-extendable, boom that can be provided on the typical gravel delivery truck, is too short to allow the gravel to be spread into the far corners of the basement floors of normally sized buildings. The result is that the conventionally-equipped truck has to be set up not only at the front of the building, but also at the back of the building. If there is no access to the back of the building, the gravel has to poured into wheelbarrows or the like for transport to the back of the site.

Specifically, it is recognised that the maximum length of (non-extendable) boom that can be accommodated on a common, ordinary gravel delivery truck is about 20 feet, and that that length is too short to allow gravel to be spread evenly over the whole basement floor of a common, ordinary building.

The invention is aimed at providing a boom that can be extended to a full length of 25 or 26 feet, so that the boom can cover the whole basement floor area of normally-sized buildings, and yet the boom is so arranged that the boom can be accommodated, when not in use, within the confines of the conventional gravel delivery truck.

The invention lies in providing a longer boom than has been the case hitherto, and in so arranging the boom that the boom can be folded. In a first aspect of the invention, the folded-over portion of the boom is arranged to occupy the space behind the driver's cab, and ahead of the rear wheels. This space is designated 7 in the truck shown in FIG. 1.

A second aspect of the invention lies in the manner of arranging the fold in the boom. In the second aspect of the invention, it is arranged that the moving conveyor belt can continue to move freely at all states of the boom, from the case where the boom is fully extended, i.e. unfolded, to the case where the folded extension portion of the boom is doubled back 180 degrees. In the second aspect, it is arranged that the length of the belt remains substantially unchanged as the boom is folded.

It should be noted that extra length is not the only reason for making the boom extendable. If the boom were to be given the extra length, but without the boom being foldable or adjustable in length, then the operator would have to adjust the position of the truck from time to time; if he first backed the truck hard up against the front edge of the site to be filled, so that the long boom could reach the far corners of the site, he would later have to drive the truck forward so that the long boom could be made to discharge gravel to the less remote parts of the site. When the boom is foldable, as in the invention, the boom can reach all parts of the site, without the operator having to move the truck.

In the truck shown in the drawings, the foldable extension portion is designated by the numeral 32. It may be noted that the main length 34 of the boom 14 lies, when not in use, over the top of the rear wheels 6, and over the top also of the wheel fairing 36, as in the previously known non-extendable booms. When the boom as illustrated is folded, and is tucked away for road use of the truck, the main length 34 stops short of the driver's cab 5, in that the front end 38 of the main length 34 of the boom 14 lies (just) behind the back wall 40 of the cab 5.

In accordance with the first aspect of the invention, when the boom is folded, and tucked away, the extension portion 32 lies below the main length 34, and occupies the space 7 between the back wall 40 of the cab and the forward end 41 of the fairing 36. The extension portion 32 is dimensioned appropriately to the size of the space 7. The extension portion 32 thus lies below the level 43 of the top of the fairing 36.

The main length 34 of the boom 14, as illustrated, is 20' 2" long. The extension portion 32 is 5' 8" long.

It is recognized in the invention that the space between the hopper 3 and the top of the fairing 36 is adequate, on this type of truck, to accommodate the size and thickness of the main length 34 of the boom, assuming that the boom is of suitable dimensions to carry and support the appropriate size of conveyer belt. It is also recognized that the space between the hopper and the fairing is not adequate to accommodate two lengths of such a boom, folded one over the other. It is recognized in the invention that the extension portion of the boom can be made to fit into the space behind the driver's cab, and ahead of the rear wheels, and when so placed, that the extension-portion is of adequate length that the boom can be used to spread gravel to both the nearest and to the remotest areas of conventionally sized and shaped building sites.

Naturally, the effectiveness of the extendable boom of the invention depends on the size, shape and accessibility of building sites. Of course, building sites are not all the same, but it has been found, as mentioned above, that the type of conventional boom that can be fitted to a gravel truck is too short, on a good proportion of ordinary building sites: it is necessary to convey gravel to the remoter corners of the site by wheelbarrow. By contrast, it has been found that on these same ordinary building sites, the extendable boom of the invention permits gravel to be delivered to all parts of the site, without the use of wheelbarrows, and without the operator needing to move the truck.

The invention should not be regarded as applying only to gravel delivery trucks. It so happens that a gravel truck typically has enough space between the hopper and the wheel fairing to accommodate a single length or portion of the boom, but not two portions, which is why the invention is so applicable to gravel trucks. But other kinds of trucks are provided with a boom and a conveyor belt, besides gravel delivery trucks. Concrete delivery trucks come into this category, for example. One difference with a concrete truck is that on a concrete truck the boom may be stowed, during road use of the truck, above the hopper. This is not possible with a gravel truck, because a gravel truck is filled by simply dumping a load of gravel into the hopper, which would damage the boom if the boom were over the hopper. However, the space between the hopper and the wheel fairing, in the area just behind the cab, on a concrete truck is more or less identical to the corresponding space on a gravel truck. The invention may therefore be applied to concrete delivery trucks, and indeed to other trucks which share that same kind of space, and share the same need for an extendable boom for a belt-conveyor, irrespective of the kind of material delivered.

The second aspect of the invention lies in the manner in which the folding of the boom is accomplished. In the invention, the joint or hinge at which the boom folds is so arranged that the length of the belt does not change, even though the boom folds through a full 180 degrees. Because the length of the belt remains the same the belt may continue to circulate around the boom, as the boom is being folded. FIGS. 5 to 8 show how this is achieved in the exemplary embodiment.

Figure 2:
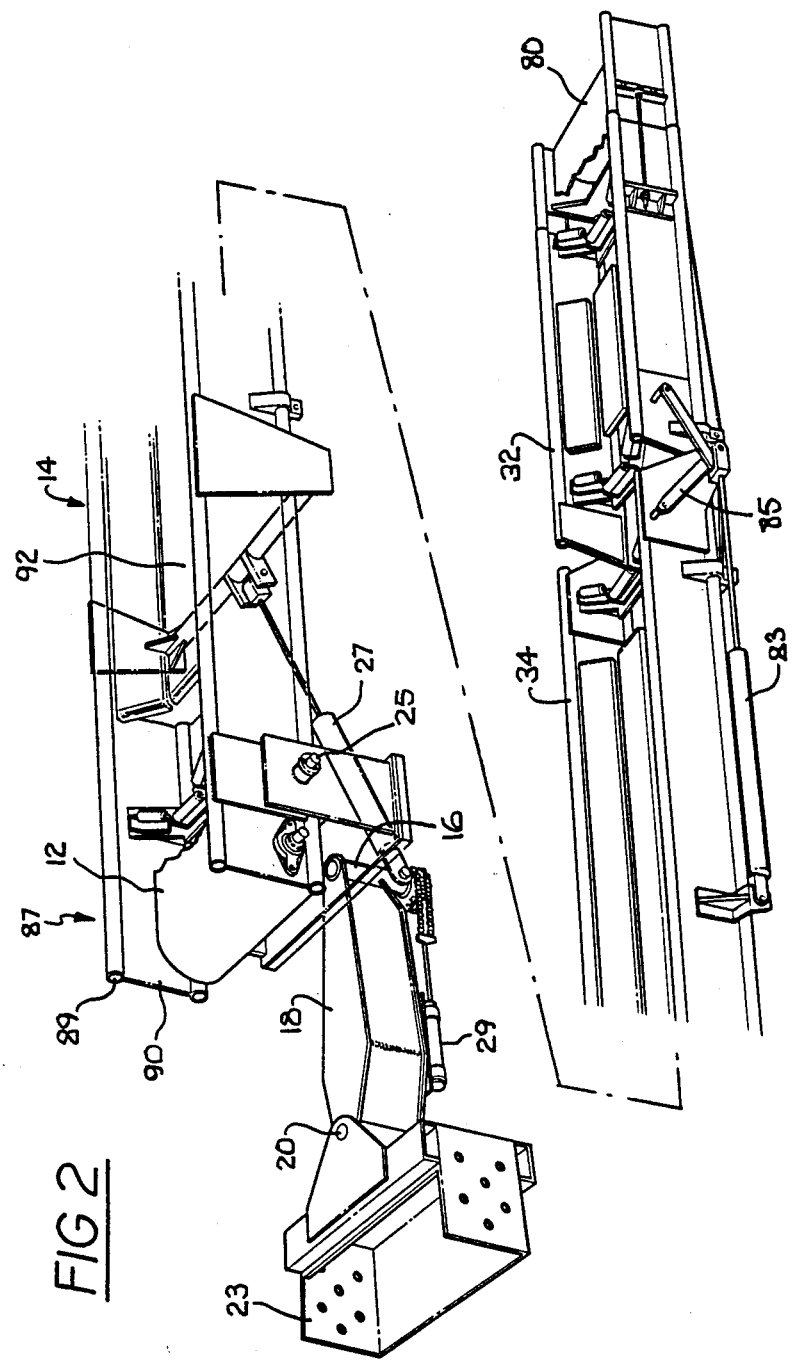
FIG. 2 is a view of a moving conveyor belt, mounted on an extendable boom, which incorporates the invention.
Figure 3:
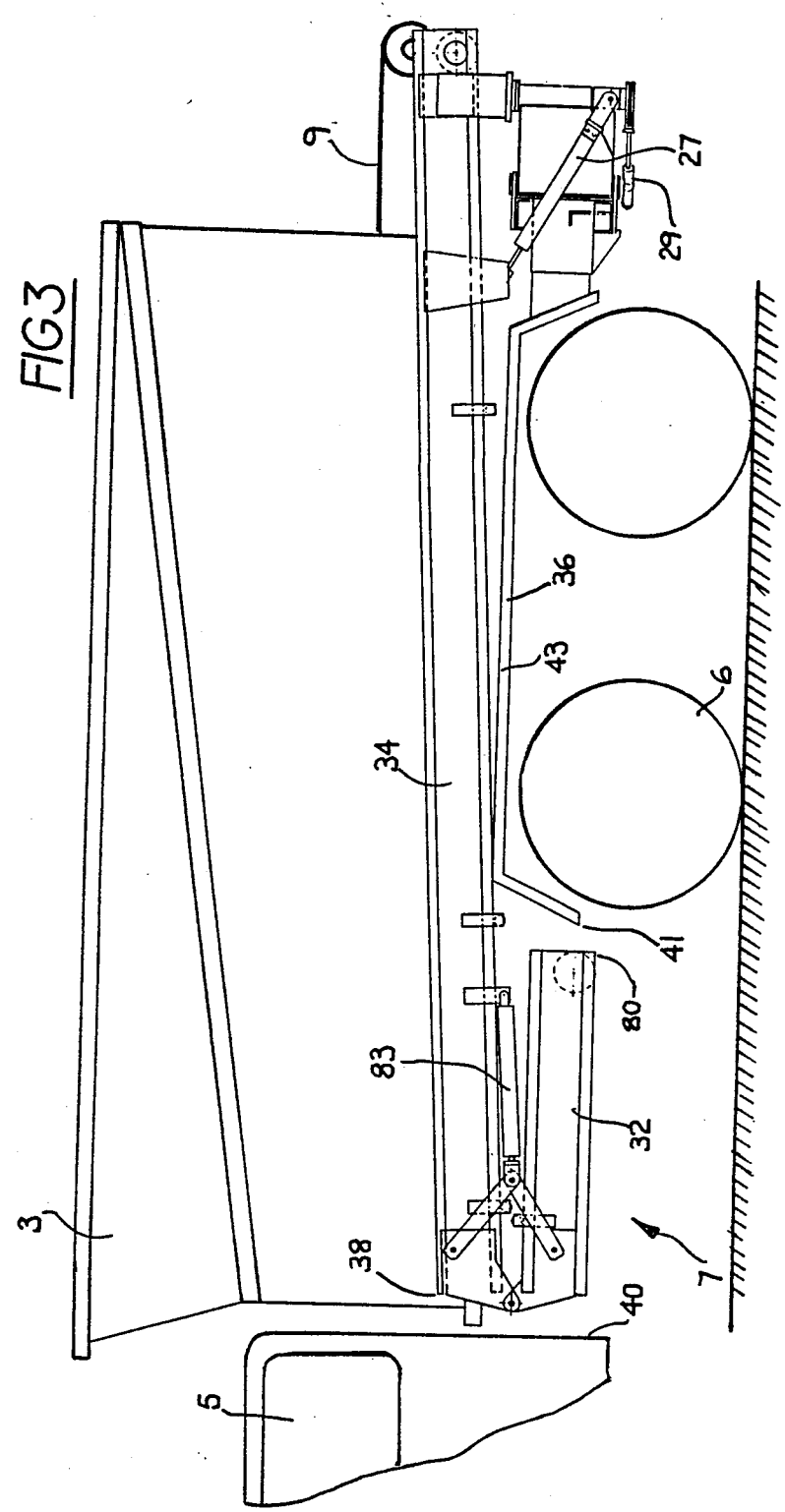
FIG. 3 is a side elevation of the truck, showing the boom of FIG. 2 folded and stowed on the truck.
Figure 5:
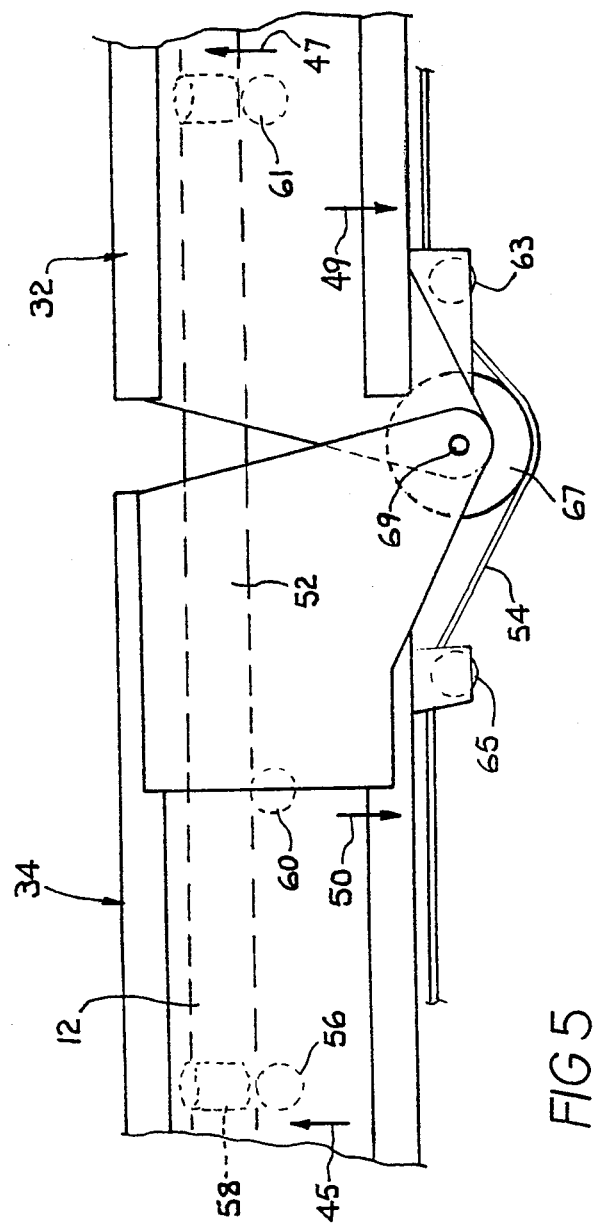
FIG. 5 is a side elevation of the joint or hinge area of the boom, showing the boom fully extended.

In the fully extended condition, shown in FIGS. 2 and 5, the belt passes through four points 45, 47, 49, 50. Points 45, 50 are fixed in the main length 34 of the boom 14, and points 47, 49 are fixed in the extension-portion 32 of the boom. The upper portion of the belt 12 between the points 45, 47 is termed the feed run 52 of the belt, and the lower portion of the belt between the points 49, 50 is termed the return run 54 of the belt. In the second aspect of the invention, it is arranged that as the length of the feed run 52 increases or decreases during folding of the boom, the length of the return run 54 decreases or increases by the same amount, in order that the sum of the lengths of the two runs may remain the same.

As it travels along the top surface of the main length 34 of the boom 14, the conveyor belt is supported, at regular intervals, on a respective bottom guide roller 56, and respective side rollers 58. The side rollers 58 are inclined at an angle, with the result that the belt 14 is concavely curved or V-shaped as it travels along the top of the boom 14. When the boom is fully extended, the concave V-shape of the belt is maintained over the area of the joint between the main length 34 and the extension portion 32.

In passing through the feed run 52, i.e. between points 45 and 47, the belt passes from a main feed roller 60 to an extension feed roller 61. The belt then continues to the end of the extension, and returns underneath the extension. In passing through the return run 54, i.e. between points 49 and 50, the belt passes from an extension return roller 63 to a main return roller 65. Between the two return rollers 63, 65 there is positioned a hinge roller 67, around which the belt passes, as shown. The hinge roller 67 is mounted for rotation about the axis 69 of the hinge about which the extension 32 pivots when the mast is being folded.

Figure 6:
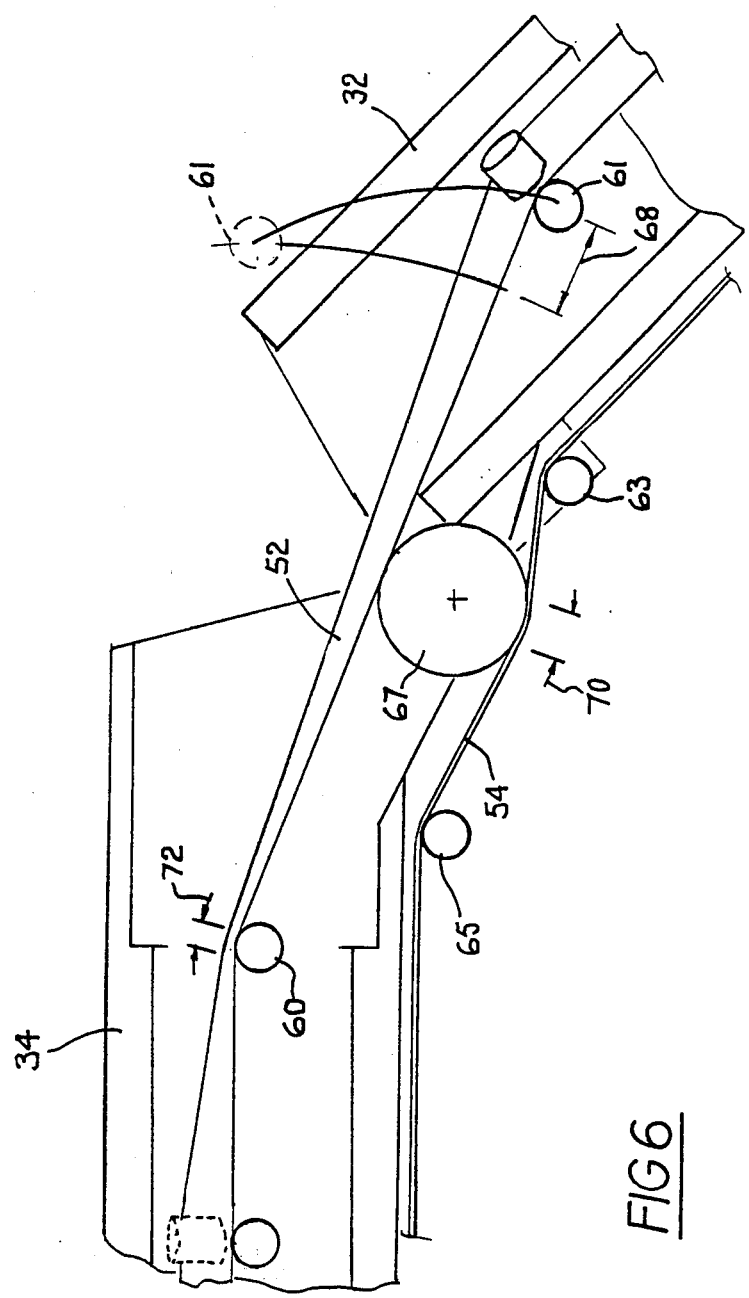

FIG. 6 shows the position when folding has commenced, and the extension 32 has rotated through forty-five degrees about the hinge axis 69. At this position, in passing through the feed run 52, the belt just touches the top of the hinge roller 67. The distance the belt travels between the two feed rollers 60, 61 has increased, by the amount indicated at numeral 68, as compared with the distance travelled when the boom is fully extended, but at the same time, the angle of wrap 70 of the belt around the bottom of the hinge roller 67 has become shortened. In computing the distance by which the feed run increases, it should also be noted that the angle of wrap 72 of the belt around the two feed-rollers 60, 61 increases between the FIG. 5 position and the FIG. 6 position.

As folding progresses, the angle of wrap 74 (FIG. 7) of the belt around the top of the hinge roller 67 starts to increase. The angle of wrap 70 of the belt around the bottom of the hinge roller continues to decrease. During this phase of folding, i.e. just after the FIG. 6 condition, when both runs 52, 54 of the belt are in contact with the hinge roller 67, the sum total of the lengths of the two runs may be seen to remain constant, because every increase in the angle 74 is accompanied by an equal decrease in the angle 70.

As folding continues again, the angle 70 becomes zero, and then the belt on the return run 54 starts to move away from the bottom of the hinge roller 67. Now, the angle of wrap 76 on the return rollers 63, 65 starts to increase, while the chordal distance 78 between the return rollers starts to decrease.

Figure 7:
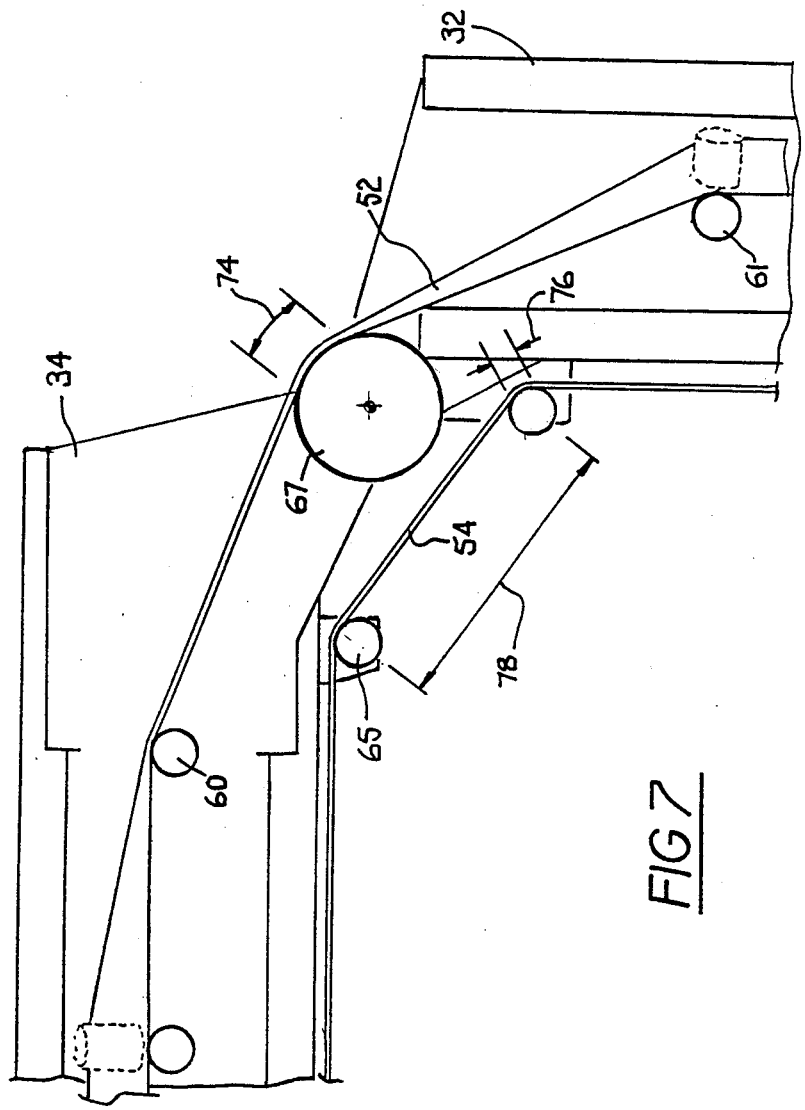

In FIG. 7 the extension has been folded through 90 degrees. As folding progresses further, the angle of wrap 74 increases still further, while the chordal distance 78 decreases. In accordance with the invention, the distance by which the angle of wrap 74, plus the angles of wrap 76, increase is equal to the distance by which the chordal distance 78 decreases.

It is recognized in the invention that the changes in the lengths of the two runs of the belt (the feed run 52 and the return run 54) go through three phases.

(1) In phase 1, the magnitude of the increase in length of the feed run is the magnitude of the increasing chordal separation between the main feed roller 60 and the extension feed roller 61, plus the magnitude of the increasing angles of wrap 72. The magnitude of the decrease in length of the return run is the magnitude of the reduction in the angle of wrap 70.

(2) Phase two starts when the belt on the feed run contacts the top of the hinge roller. Now, the magnitude of the increase in length of the feed run is the magnitude of the increase in the length of wrap 74. The magnitude of the decrease in length of the return run in phase 2, as in phase 1, is the magnitude of the reduction in the length of wrap 70.

(3) Phase 3 starts when the belt on the return run breaks contact with the hinge roller. The magnitude of the increase in length of the feed run continues to be the magnitude of the increase in the length of wrap 74. The magnitude of the decrease in the length of the return run now is the decrease in magnitude of the chordal separation 78, plus the decrease in magnitude of the lengths of wrap 76.

In all the phases, it must be ensured, in accordance with the invention, that the return run is shortened by the same length as that by which the feed run is lengthened. It may be noted that in phase 2, this equality of the change of the two lengths is easily attained, because any change in the length of wrap 74 must effect an equal change in the length of wrap 70. In phases 1 and 3, the geometry is less simple, but, as is recognised in the invention, it is still possible to achieve the required equality during those phases.

It may be noted that the equality required between the two length changes need not be absolute. The belt is made of rubber, and is resilient to some extent. Also, conveyer belts of this kind are invariably fitted with some kind of a belt tensioner, by means of which the belt tension is maintained at a constant value. The tensioner is necessary because the belt length can vary as it gets older, or is subject to abuse, and to allow the tension to be relieved to allow the belt to be assembled to the boom. In the boom illustrated, the belt tensioner is incorporated into the remote end 80 of the extension 32.

It is recognized, however, that the equality should be as close as can reasonably be achieved, notwithstanding the resilience of the rubber, and the presence of the belt tensioner.

It has been recognized in the second aspect of the invention that it is possible to maintain the length of the belt constant (and thus to maintain the tension in the belt constant) during folding of the boom, not by building in still more resilience, but by means of an appropriate geometrical layout of the various pivots and guides.

Previously, it has been proposed that a conveyor belt may be prevented from undue stretching, while the boom is undergoing folding, by building-in sufficient resilience into the belt tensioner. This has virtually never proved practicable, however.

It is recognized in the invention that the above-described phase 2, though of simple geometry, is not essential to the invention. Phase 2 may be omitted, in that the return run 54 of the belt may be arranged to break contact with the bottom of the hinge roller just as (or indeed before) the feed run 52 has started to make contact with the top of the hinge roller.

It is recognized also that phases 1 and 3 might be left out, leaving only phase 2.

Attention will now be directed to some of the details of construction of the foldable boom, as illustrated.

It may be noted that the side rollers 58 are omitted at the location of the main feed roller 60. It has been found beneficial to omit these rollers, but to keep the side rollers at the location of the extension feed roller 61. This arrangement means that when the boom is fully extended, the concavity of the belt is adequately maintained over the hinge area, but at the same time the belt is able to undergo the bending required during folding of the boom, smoothly and without buckling.

FIG. 8 illustrates the condition when the boom has been folded the full 180 degrees. It may be noted that the two return rollers 63, 65 do not interfere with each other as folding is completed: as shown, the two rollers are at different radiuses with respect to the hinge axis 69.

Previous conveyer-belt booms have been foldable to some extent, but it has been the case with these booms that the length of the belt would be changed considerably by the act of folding the boom. Therefore, the boom could only be folded through a limited angular movement.

By contrast, the full range of folding movement of the boom can take place in the invention while the belt is still running. This fact adds to the versatility of the use of the boom of the invention. The end of the boom, i.e. the outer end 80 of the extension, may be lowered almost to the level of the basement floor, so that the gravel may be deposited gently thereon. Also, the main portion 34 may be angled upwards at a considerable angle, while the extension is horizontal, or angled downwards. All these possibilities increase the ease with which the gravel (or other material being delivered) can be placed accurately, and under tightly controlled conditions.

The folding of the extension 32 is accomplished by means of a ram 83, which operates in conjunction with a lever arrangement 85.

Both portions 32, 34 of the boom 14 are so constructed as to be light in weight. It is important that the boom should be adequately rigid, so that the boom does not bounce and sag unduly in operation. This desired rigidity should not be provided at the expense of a heavy structure, however, as that would then make the up and down and side to side movements of the boom awkward and cumbersome to control.

The desired light-though-rigid requirement for the boom can be achieved by the use of the structure as shown. The portions 32, 34 of the boom have respective side walls 87.

Each side wall 87 comprises upper and lower lengths of cylindrical aluminum tubing 89, welded to a sheet aluminum web 90. The side walls are joined to each other by top 92 and bottom plates. This structure has excellent rigidity: not only in the up/down bending and left/right bending modes, but also in the torsional mode. The top plate 92 serves to define the concave V-shape of the belt, along with the rollers 56, 58.

The structure as shown and described is also versatile. If the boom were, for example, to be made from a large extruded section, it might be difficult to provide attachment points on the section for the various components, at the ends of the two portions: it often proves difficult to "feed" forces into a structure that has been designed for lightness in that manner. An extruded section of the structure might have to be compromised, just to provide an adequate mounting point. The boom structure as shown, however, is admirably suited to the firm, rigid, attachment of components. The side walls 87, because they have the tubes 89 at their edges, may extend beyond the main bulk of the portion of the boom, and be unsupported by the top and bottom plates, yet still not lose rigidity unduly.

Other structures could be designed which had good torsional stiffness, but the structure as shown, with the tubes along the edges of the webs, makes it possible to provide good, stiff hinge attachment points, and firm, solid abutments for the various rams and other components, without compromising the overall lightness of the structure.

We claim:

1. A delivery truck comprising:
  a hopper, for containing material to be delivered;
  a moving conveyor belt mounted on a boom, for dispensing material from the hopper, the boom comprising a main portion and an extension portion, and the extension portion and the main portion are relatively foldable; a chassis, and a rear wheel; a space which lies alongside the chassis, forward of the rear wheel, and below a horizontal level of a top of the said rear wheel; means for stowing the boom, when so folded, on the truck, during road use of the truck, and for placing the said main portion, when the boom is folded and stowed, vertically over the rear wheel;
  and the arrangement being such that the extension portion, when the boom is folded and stowed, lies vertically below the main portion, and in the said space alongside the chassis, forward of the rear wheel, and below the horizontal level of the top of the rear wheel.

2. The truck of claim 1, and further including;
  a means for attaching the main portion, at its inner end, to the chassis of the truck;
  a means for attaching the extension portion to an outer end of the main portion;
  a driver's cab having a front and a rear, and the said space is bounded to the front by the rear of the driver's cab.
  and the arrangement being such that the outer end of the main portion, when the boom is folded and stowed, lies close to the rear of the driver's cab.

3. The truck of claim 2, and further including:
  a hinge means, for hinging or pivoting an inner end of the extension portion to the outer end of the main portion;
  and the arrangement being such that the extension portion, when the boom is folded and stowed on the truck, lies with its inner end close to the rear of the driver's cab, and its outer end close to a front portion of the rear wheel.

4. The truck of claim 3, wherein the hinge means is so arranged:
  that, when the boom is extended and unfolded, the extension portion is an in-line continuation of the main portion;
  and that, when the boom is folded and stowed, the extension portion is doubled underneath the main portion at an angle of 180 degrees.

5. The truck of claim 1, wherein the hopper is wide open at the top.

6. The truck of claim 1, and further including:
  a hinge pivot, about which the extension portion is pivotable with respect to the main portion, through a substantial angular range;
  a means for passing the moving belt along a line from a point fixed on the main portion to a point fixed on the extension portion, the line of the belt between these two points being a feed run of the belt;
  a means for returning the moving belt along a line from a point fixed on the extension portion to a point fixed on the main porton, the line of the belt between these two points being a return run of the belt;
  the arrangement being such that respective lengths of the feed and return runs change when the main and extension portions are hinged or pivoted relatively about the said hinge pivot;
  a means for ensuring that any increase in the length of one of the runs, as a consequence of the said pivoting movement, is matched by a corresponding decrease in the length of other of the runs;

whereby a sum total of the lengths of two runs remains constant, over the said annular range.

7. A moving-belt conveyor apparatus, which is suitable for use in delivering bulk material from a hopper truck, comprising: a boom, and a moving belt which circulates around the boom, and the boom further comprising:

two portions, a main portion and an extension portion;

a hinge pivot, about which the extension portion is pivotable with respect to the main portion, through a substantial angular range;

a means for passing the moving belt along a line from a point fixed on the main portion to a point fixed on the extension portion, the line of the belt between these two points being a feed run of the belt;

a means for returning the moving belt along a line from a point fixed on the extension portion to a point fixed on the main portion, the line of the belt between these two points being a return run of the belt;

a means for ensuring that any increase in the length of one of the runs, as a consequence of the said pivoting movement, is matched by a corresponding decrease in the length of other of the runs;

the ensuring means includes a hinge guide which comprises a cylindrical roller, mounted for rotation about the axis of the hinge pivot;

the ensuring means includes a main feed guide, which is fixed in the main portion, and an extension feed guide, which is fixed in the extension portion;

the arrangement being such that in feeding through the feed run of the belt the belt passes from the main feed guide to the extension feed guide;

the ensuring means includes an extension return guide, which is fixed in the extension portion, and a main return guide, which is fixed in the main portion;

the arrangement is such that in returning through the return run of the belt the belt passes from the extension return guide to the main return guide;

the arrangement being such that, during folding of the boom about the hinge pivot, the feed run and the return run pass through the following phases;

one phase, in which the belt in the feed run passes directly from the main feed guide to the extension feed guide, and is clear of the hinge guide, and in which the belt in the return run passes from the extension return guide directly to the hinge guide, is wrapped around the hinge guide for a substantial length, and then passes directly to the main return guide, wherein, in the said one phase, any increase in the distance apart of the two feed guides due to a folding of the boom about the hinge pivot, is equal to the corresponding decrease in the said length of wrap in the return run;

and another phase, in which the belt in the feed run passes from the main feed guide directly to the hinge guide, is wrapped around the hinge guide for a substantial length, and then passes directly to the extension feed guide, and the belt in the return run passes directly from the extension return guide to the main return guide, and is clear of the hinge guide, wherein, in the said another phase, any increase in the said length of wrap in the feed run due to a folding of the boom about the hinge pivot, is equal to the corresponding decrease in the distance apart of the two return guides.

8. The apparatus of claim 7, wherein each of the four guides comprises a respective roller, which is mounted for rotation in the respective portion.

9. The apparatus of claim 7:

wherein, during folding of the boom about the hinge pivot, the belt in the feed run passes from the main feed guide directly to the hinge guide, is wrapped around the hinge guide for a substantial length, and then passes directly to the extension feed guide, and in which the belt in the return run passes from the extension return guide directly to the hinge guide, is wrapped around the hinge guide for a substantial length, and then passes directly to the main return guide;

and wherein any increase in the said length of wrap in the feed run, due to a folding of the boom about the hinge pivot, is equal to the corresponding decrease in the said length of wrap in the return run.

10. The apparatus of claim 7, wherein:

during folding of the boom about the hinge pivot, the feed run and the return run pass through the following phases:

phase 1, in which the belt in the feed run passes directly from the main feed guide to the extension feed guide, and is clear of the hinge guide, and in which the belt in the return run passes from the extension return guide directly to the hinge guide, is wrapped around the hinge guide for a substantial length, and then passes directly to the main return guide;

wherein any increase in the distance apart of the two feed guides due to a folding of the boom about the hinge pivot, is equal to the corresponding decrease in the said length of wrap in the return run;

phase 2, in which, during folding of the boom about the hinge pivot, the belt in the feed run passes from the main feed guide directly to the hinge guide, is wrapped around the hinge guide for a substantial length, and then passes directly to the extension feed guide, and in which the belt in the return run passes from the extension return guide directly to the hinge guide, is wrapped around the hinge guide for a substantial length, and then passes directly to the main return guide;

and wherein any increase in the said length of wrap in the feed run, due to a folding of the boom about the hinge pivot, is equal to the corresponding decrease in the said length of wrap in the return run;

and phase 3, in which the belt in the feed run passes from the main feed guide directly to the hinge guide, is wrapped around the hinge guide for a substantial length, and then passes directly to the extension feed guide, and the belt in the return run passes directly from the extension return guide to the main return guide, and is clear of the hinge guide;

and wherein any increase in the said length of wrap in the feed run due to a folding of the boom about the hinge pivot, is equal to the corresponding decrease in the distance apart of the two return guides;

and wherein during folding of the boom from a completely extended condition to a fully folded condition, the feed run and the return run pass through the said three phases in the numerical order stated.

* * * * *